United States Patent [19]

Shaver

[11] Patent Number: 5,145,116
[45] Date of Patent: Sep. 8, 1992

[54] SPREAD SHIFTER DEVICE FOR BROADCAST SPREADERS

[75] Inventor: Paul V. Shaver, Harrisburg, Pa.

[73] Assignee: True Temper Hardware Company, Miamisburg, Ohio

[21] Appl. No.: 665,336

[22] Filed: Mar. 6, 1991

[51] Int. Cl.⁵ ............................................. A01C 17/00
[52] U.S. Cl. .................................... 239/665; 239/685; 239/687
[58] Field of Search ................. 239/665, 681, 685, 687

[56] References Cited

U.S. PATENT DOCUMENTS

| | | |
|---|---|---|
| 1,058,103 | 4/1913 | Rittenhouse . |
| 2,941,811 | 6/1960 | Sherer . |
| 3,586,246 | 6/1971 | van der Lely et al. . |
| 3,738,546 | 6/1973 | Speicher ........................ 239/687 |
| 3,807,643 | 4/1974 | Bowerman . |
| 3,819,120 | 6/1974 | Walker . |
| 3,979,071 | 9/1976 | Biggs, Jr. . |
| 4,548,362 | 10/1985 | Doering ........................ 239/685 |
| 4,609,153 | 9/1986 | van der Lely ................ 239/665 |

FOREIGN PATENT DOCUMENTS

| | | | |
|---|---|---|---|
| 161334 | 9/1979 | Netherlands .................. 239/681 |
| 785829 | 11/1957 | United Kingdom ........... 239/687 |

Primary Examiner—Andres Kashnikow
Assistant Examiner—Karen B. Merritt
Attorney, Agent, or Firm—Killworth, Gottman, Hagan & Schaeff

[57] ABSTRACT

A spreader including a feed gate having a feed gate opening is provided. The area of the feed gate opening may be varied to adjust the spread pattern and material distribution to accommodate different speeds at which the spreader is operated, and different materials which may be spread. Such adjustment is accomplished by linearly sliding a spread shift plate having a wide and narrow section across one end of the feed gate opening, to open or close off the end portion of the feed gate opening. Such adjustment also varies the area of the feed opening in the spreader hopper.

20 Claims, 7 Drawing Sheets

SPREAD SHIFTER DEVICE FOR BROADCAST SPREADERS

BACKGROUND OF THE INVENTION

The present invention relates to broadcast spreaders for seeds and granular materials, and in particular, to a device for shifting the spread pattern of a broadcast spreader to provide an even distribution of seeds or material to accommodate various speeds of operation, material densities, and material granular sizes.

Broadcast spreaders are generally known for dispersing seeds or other granular material from a hopper. Typically, such material is metered through an aperture in the hopper onto a rotating impeller and cast therefrom in a pattern. Some spreaders are hand-held and operated. Typically, they are wheelmounted, and the impeller rotates at a rate related to the speed at which the spreader moves by interconnection to a wheel or axle of the spreader.

While effective in dispersing materials, broadcast spreaders have long been known to provide uneven sowing, and maintenance of an even spread pattern has long been sought. The distribution of material from a broadcast spreader is affected by the position and rate at which material is placed on the impeller, the rate of impeller rotation, and the type of material distributed.

For example, where impellers are driven by interconnection with a wheel or axle of the spreader, the rate of impeller rotation varies with the speed at which the spreader moves. Such broadcast spreaders are typically designed to provide an even spread pattern when moving at an optimum design speed. When individual walking speeds vary from the design speed, the impeller rate changes, and the spread pattern shifts to one side or another. The position and rate at which material is placed on the impeller also affect the location of the spread pattern, so that the shape and position of the feed opening to the impeller may vary the spread pattern. Even application of material and proper orientation of the spread pattern have, consequently, been the subject of numerous developments.

Rittenhouse, U.S. Pat. No. 1,058,103, discloses a handseeder having a peculiarly shaped feed opening and controlling slide for evenly sowing seeds of different sizes at different feed rates. Sherer, U.S. Pat. No. 2,941,811 discloses another such feed opening on a wheel-mounted spreader The feed opening is shaped to provide a uniform distribution of material despite the density of application or speed at which the spreader moves. Doering, U.S. Pat. No. 4,548,362, further discloses a metering apparatus for separately controlling the spread pattern and the flow rate of a broadcast spreader by cooperatively adjusting openings in rotatable plates at the feed opening of the hopper.

Broadcast spreaders are extremely effective in dispersing particulate materials. However, lighter materials have different spread patterns than heavier materials in the same spreader.

Thus, the need exists to provide adjustments which enable versatility in use of spreaders. Moreover, further improvements continue to be sought to provide even distribution and consistent spread patterns.

SUMMARY OF THE INVENTION

The present invention meets the continuing need for improved means for providing even distribution and spread patterns of particulate materials from broadcast spreaders.

It is an object of the present invention to provide a means for adjusting the spread pattern to accommodate operation of wheel-mounted spreaders at speeds above design speeds.

It is a further object of the present invention to provide a means for adjusting the flow rate of material to an impeller to achieve an even spread pattern and uniform concentration of material in the spread pattern.

Still further, it is an object of the present invention to provide a means for adjusting the flow rate of material to an impeller to controllably vary the spread pattern of a broadcast spreader.

Wheel-mounted spreaders with wheel or axle-driven impellers, are typically designed to provide an even spread pattern of desired concentration when operated at a one design speed, for example at 3 miles per hour (mph). An even spread pattern is one in which a substantially equal amount of material is thrown to the left and right of the spreader as it proceeds in a given direction. The concentration of material, defined as the amount of material distributed by the spreader per unit area, typically expressed in pounds per square feet, is preferably generally uniform. Generally uniform concentration typically results from even spread patterns. Practically, generally uniform concentration is only approximated, and a cross-section of distribution would show a flattened bell curve with slightly higher concentration at the middle, and tapering quickly at the edges of the spread pattern. However, if the operator walks faster, the spread pattern will shift to one side. Where the impeller rotates counter-clockwise, as seen from above, the spreader operated at above design speed will cast more material to the right side, as seen from the operator's position, and produce a wider, but skewed, spread pattern and concentration. As well, when operated at above design speeds, the spreader distributes less material per unit area, due to the wider spread pattern. Similarly, if the impeller rotates clockwise, the same effect will occur, but to the left side. Hereafter, while only counter-clockwise rotation of the impeller will be considered, it is understood that the present invention may be applied in like manner to the case of clockwise impeller rotation.

Where the impeller rotates in a counter-clockwise direction as viewed from above, it has been found that increasing the area of the feed gate opening and the feed opening towards the right, as seen from the operator's position above the spreader, in accordance with the present invention, advantageously evens out the spread pattern and concentration of particulates. The increased area of the feed gate opening is so positioned that the increased flow rate of material compensates for the wider, skewed spread pattern. That is, the additional material placed on the right side of the impeller is initially deposited further around in the direction of rotation, and results in causing additional material to be thrown off to the left side. Placement of the material on the impeller provides for additional amounts of material to be spread over the spread pattern. The amount of area added to the feed gate opening is variable, so that the operator can adjust the opening and shift the spread pattern depending on his operating speed or the material used, to achieve the required flow rate for an even spread pattern and generally uniform concentration.

The present invention is designed for use on spreaders having a feed opening at the bottom of a hopper, which opening is preferably in the shape of a slightly arcuate horizontal opening. A feed gate is provided preferably having a feed gate opening at least as large as the feed opening. The feed gate comprises a first means for varying the area of the feed opening through which material may flow. The feed gate opening may be aligned with the feed opening to open up the feed opening, or the feed gate body may be drawn across the feed opening to block all or some flow of material therethrough. In an alternative embodiment, the feed gate opening may be the excised area of a generally U-shaped feed gate body.

Regardless, in accordance with the present invention, an end portion of the feed gate opening, preferably a portion of the right end, as viewed from the operator's position above the spreader, is provided with a spread shift plate positioned across the feed gate opening. The spread shift plate includes a notch. Slidably disposed in a recessed groove on the surface of the feed gate, the spread shift plate may be positioned to variably align the notch with the feed gate opening. The spread shift plate may thus be used to increase the open area of the feed gate opening or to block that area, and constitutes a second means for varying the area of the feed opening and the varying the area of the feed gate opening. The notch is preferably in the shape of a quadrangle, and one or more sides may be generally parallel to a side of the feed gate opening over which it may be variously positioned.

The recessed groove of the feed gate wherein the spread shift plate slides, includes a slot through which a threaded stud extends from the spread shift plate. A wing nut may be tightened on the stud to hold the spread shift plate fixed in position on the feed gate. The spread shift plate, thus, remains in position as the feed gate opens and closes across the feed opening. The spreader may thereby be adapted to accommodate the individual walking rates of its operator or a specific material being used, to provide an even spread pattern and desired concentration of material area in the wider spread pattern.

In an alternative embodiment, the feed opening and the feed gate opening may be extended to the left, as viewed from the operator's perspective above the spreader, and the spread shift plate located on the left side of the feed gate opening to vary the area thereof and the area of the feed opening, as previously described. Again, the impeller rotates in the counter-clockwise direction. This embodiment also provides some spread pattern shift, and provides some additional material to make the concentration more uniform. However, a shift towards a more even spread pattern and more uniform concentration is obtained in the preferred embodiment where the spread shift plate is on the right side of the feed gate opening.

Further objects and advantages of the invention will become apparent from the drawings and detailed specification which follow.

DETAILED DESCRIPTION OF THE PREFERRED EMBODIMENT

Figure 1:
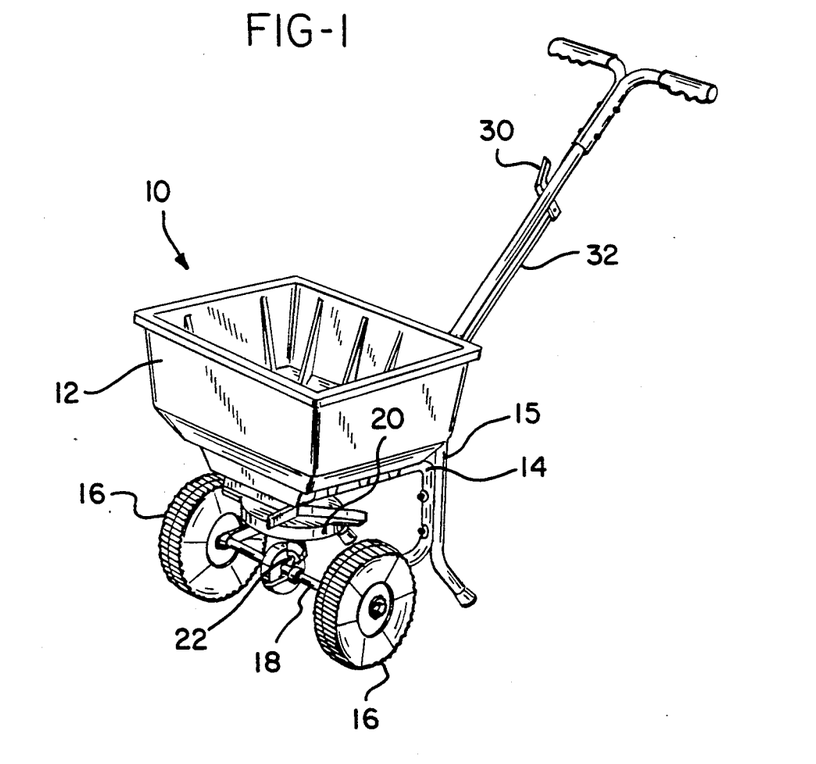
FIG. 1 is a perspective view of the broadcast spreader of the present invention.
Figure 2:
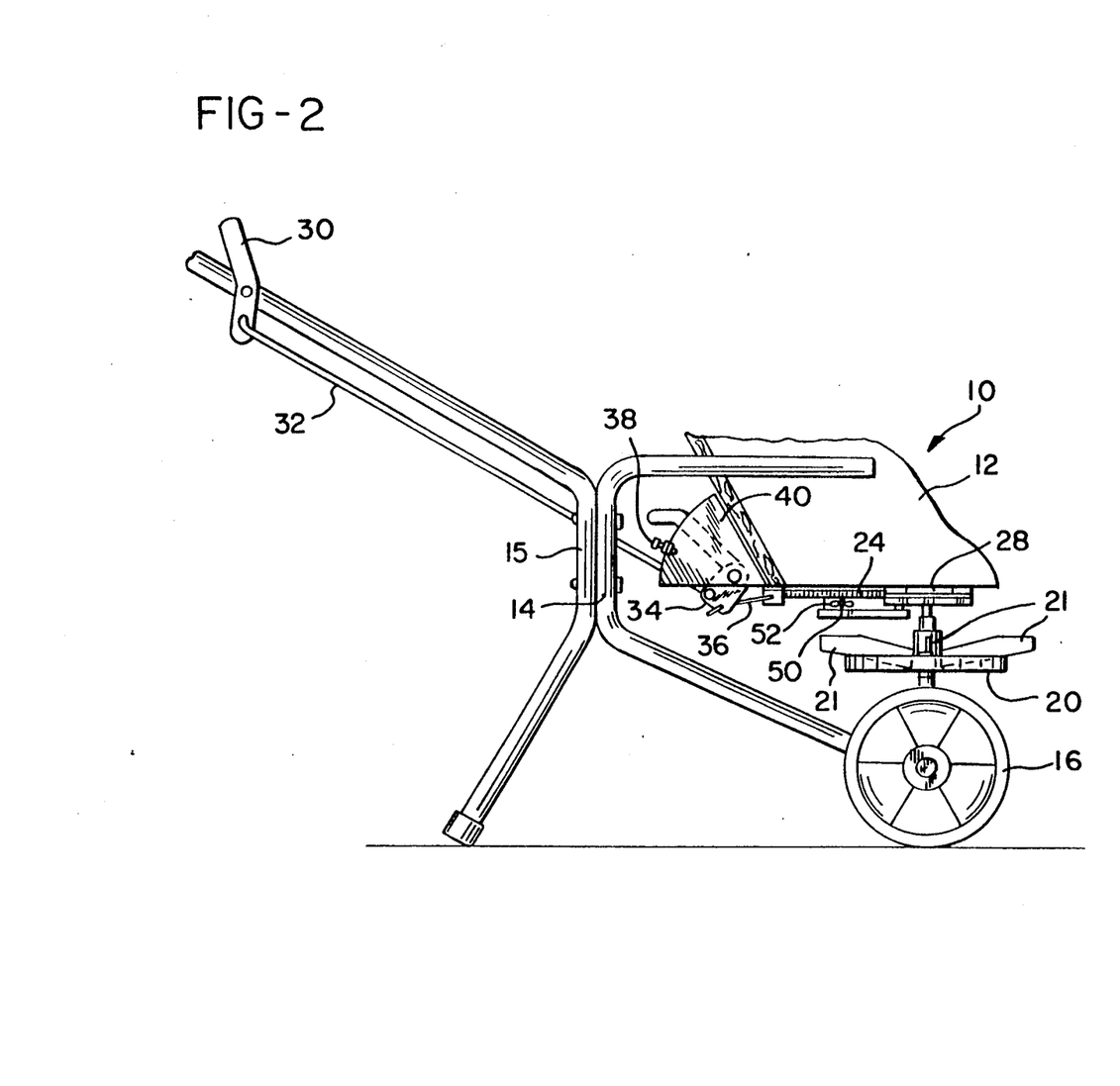
FIG. 2 is a partial side elevational view of the broadcast spreader of the present invention.
Figure 3:
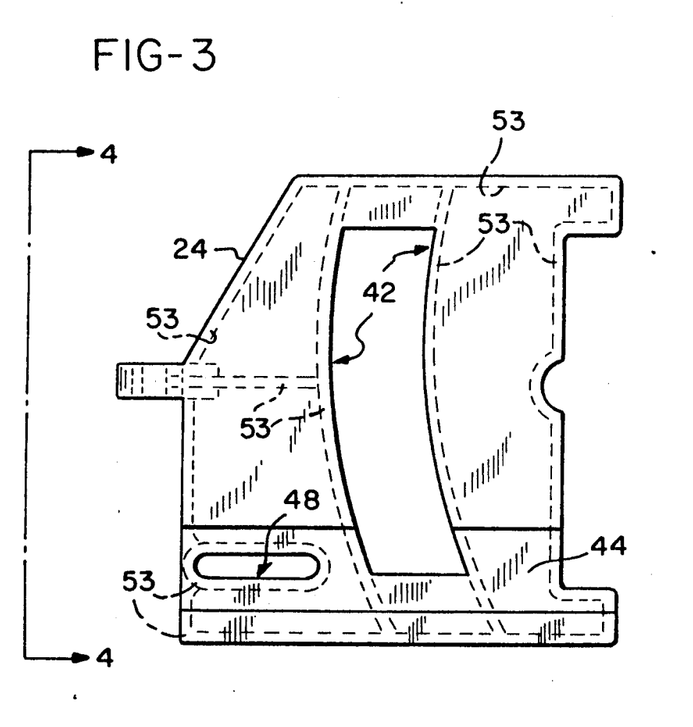
FIG. 3 is a top plan view of the feed gate of the present invention.
Figure 4:
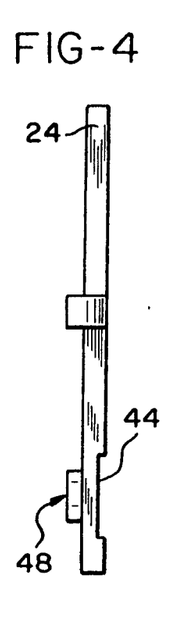
FIG. 4 is an end view of the feed gate of FIG. 3 along line 4—4 in FIG. 3.
Figures 5, 8, 9:
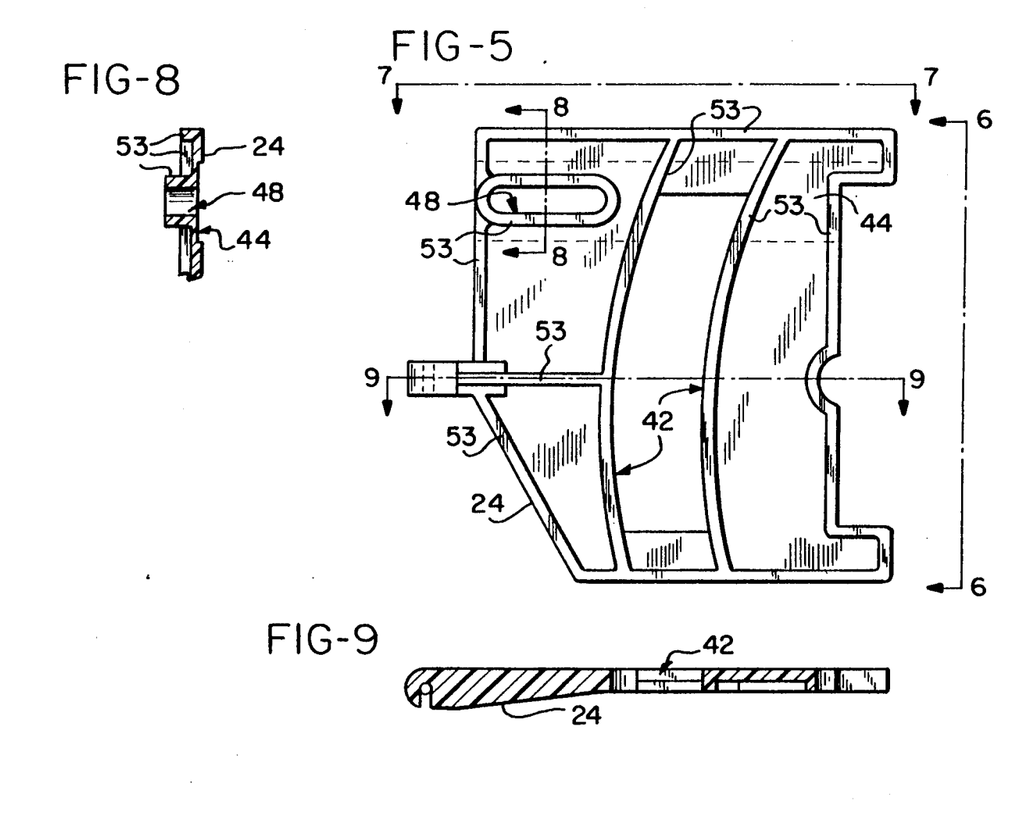
FIG. 5 is a bottom view of the feed gate of the present invention.
FIG. 8 is a cross-sectional view of the slot in the feed gate of FIG. 5 taken along line 8—8 in FIG. 5.
FIG. 9 is a cross-sectional view of the feed gate of FIG. 5 taken along line 9—9 in FIG. 5.
Figure 6:
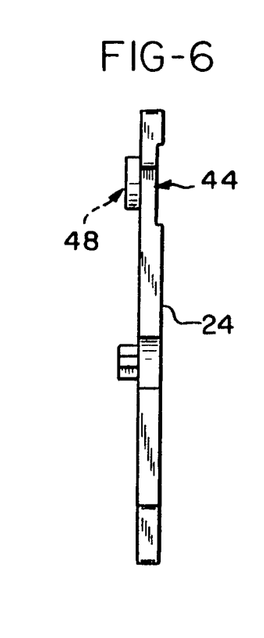
FIG. 6 is an end view of the feed gate of FIG. 5 along line 6—6 in FIG. 5.
Figure 7:
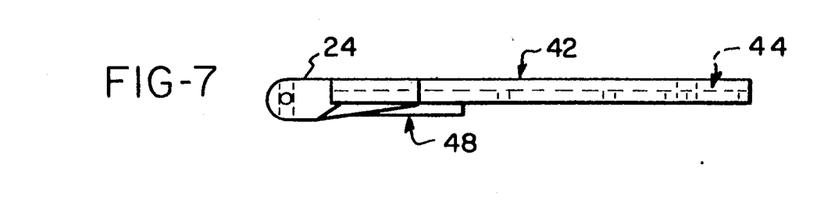
FIG. 7 is a side view of the feed gate of FIG. 5 along line 7—7 in FIG. 5.

Referring to FIGS. 1 and 2, the broadcast spreader 10 of the present invention is shown in the preferred embodiment. As shown, spreader 10 comprises a hopper 12, connected to supporting frame 14, 15, and a wheel and axle assembly of wheels 16 and axle 18. Impeller 20 is rotatably connected to hopper 12 and connected to the wheel and axle assembly by means for transmitting rotary motion 22. Means for transmitting rotary motion 22 conveys the rotary motion of the wheels to drive impeller 20, and preferably comprises a series of rotatable gears intermeshing in series. Impeller 20 is positioned to receive particulate material from hopper 12, and, preferably, rotates in a counter-clockwise direction as viewed from above. It is understood that the present invention may also be adapted for use where the impeller 20 rotates clockwise. In that case, the geometry of feed opening 26, feed gate 24, feed gate opening 42, and spread shift plate 46 would, preferably, be mirror images of that disclosed herein.

As best seen in FIG. 2, impeller 20 preferably comprises four fins 21 extending radially on the generally concave face of impeller 20, and are spaced at generally 90 degree angles. Fins 21 also extend radially outward from the concave face in the shape of an inverted "T".

Broadcast spreaders are typically used for dispersing seeds, salt, fertilizers and other lawn products, and the present invention is intended for use with all materials which may be dispersed by broadcast spreaders. The present invention makes possible adaptation of a spreader for use with particulates of different weights.

Figure 12:
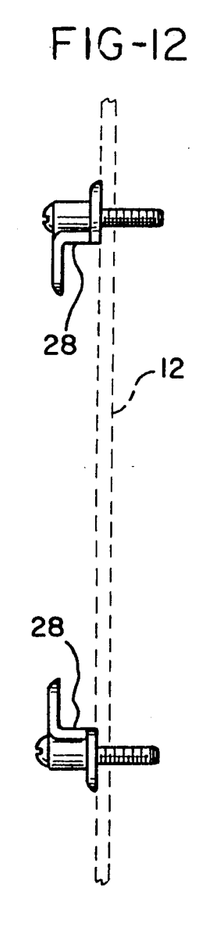
FIG. 12 is a partial side elevational view of means for slidably retaining the feed gate of the present invention.
Figure 13:
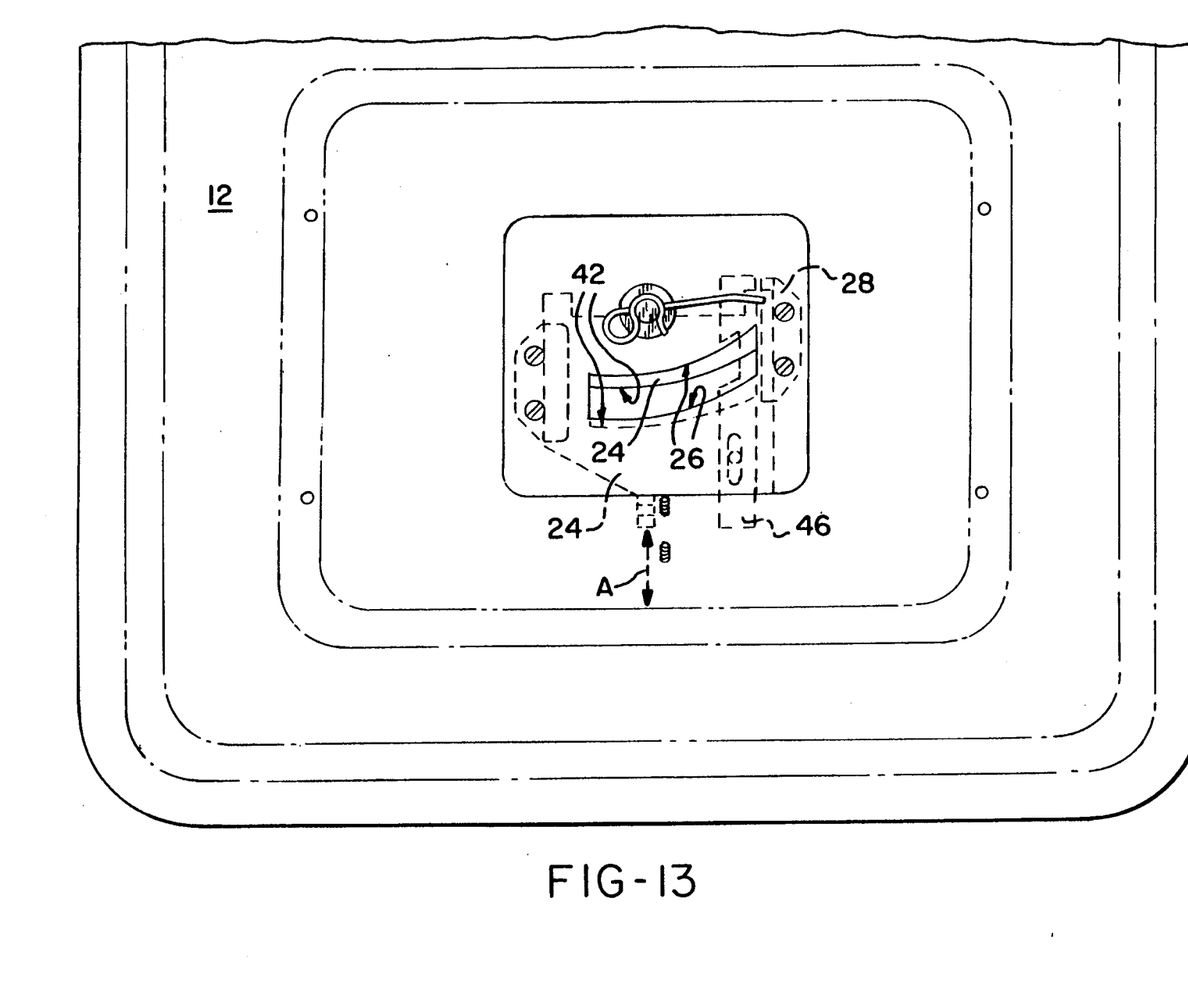
FIG. 13 is a top plan view of the hopper of the present invention.

As shown in FIGS. 2 and 13, feed gate 24 of the present invention is slidably disposed below hopper 12 across feed opening 26 in hopper 12. Feed gate 24 slides on tracks 28, shown in detail in FIG. 12. Means for slidably positioning feed gate 24 are best shown in FIG. 2 and in the preferred embodiment include control lever 30, control rod 32, plate 34, connecting link 36 and control stop 38 on graduated plate 40. In cooperation with the other elements, control stop 38 provides a means to limit the travel of feed gate 24. Control stop 38 may be adjusted along graduated plate 40 to change the limit of travel of feed gate 24.

As shown in FIGS. 3-7 and 9, feed gate 24 includes feed gate opening 42 which is alignable with feed opening 26 as seen in FIG. 13. Feed gate opening 42 is preferably at least as large as feed opening 26 and, like feed opening 26, preferably has an arcuate, slot-like or rectangular shape. As shown in FIG. 13, the longitudinal axis of feed gate opening 42 is preferably generally transverse to the general linear direction in which feed gate 24 slides, indicated by arrow A in FIG. 13. Feed gate 24 may be slidably positioned to vary the area of feed opening 26 through which material may flow to the impeller. When feed gate opening 42 is completely aligned with feed opening 26, maximum flow is possible, depending on the position of spread shift plate 46, as further discussed below.

Figure 10:
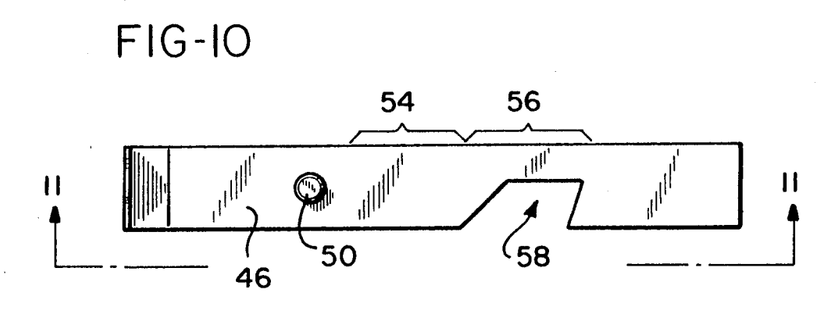
FIG. 10 is a top plan view of the spread shift plate of the present invention.
Figure 11:
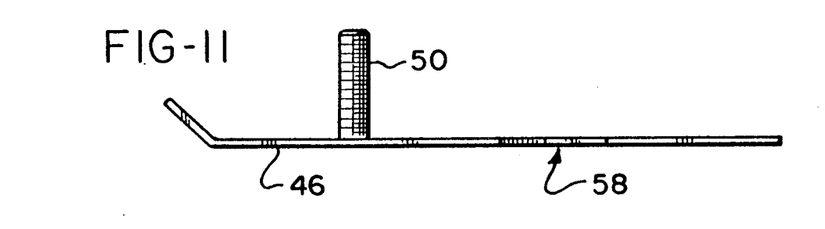
FIG. 11 is a side view of the spread shift plate of the FIG. 10 along line 11—11 in FIG. 10.

As further seen in FIGS. 3–8, feed gate 24 includes a groove 44 in one surface in which spread shift plate 46, as shown in FIG. 13, is slidably disposed. Feed gate 24 also includes a slot 48 in which stud 50 of spread shift plate 46, shown in FIGS. 10 and 11, slides. As shown in FIG. 2, stud 50 projects downward through slot 48 for fixedly positioning spread shift plate 46 on feed gate 24 with wing nut 52. Further shown in FIGS. 3–9, feed gate 24 preferably includes a plurality of reinforcing ribs 53 positioned around its outer edges and along sides of feed gate opening 42 and slot 48. As best shown in FIG. 10, spread shift plate 46 includes a wide portion 54 and a narrow portion 56 defined by notch 58. Notch 58 extends inward from one edge of spread shift plate 46, as shown in FIG. 10. By variably and linearly positioning notch 58 in groove 44, spread shift plate 46 provides a second means for varying both the area of feed opening 26 and the area of feed gate opening 42, as representatively shown in FIG. 13. Preferably, as also shown in FIG. 13, the linear positioning of spread shift plate 46 is in a direction generally parallel to the linear direction indicated by arrow A in which feed gate 24 slides.

In accordance with the present invention, spread shift plate 46 may be used to increase or decrease the area of feed gate opening 42 and feed opening 26, at the right ends thereof, as seen from the operator's viewpoint, shown in FIG. 13. When the spreader is operated at design speed, 3 miles per hour, spread shift plate 46 is preferably closed across the end portion of feed gate opening 42. The shape and position of feed opening 26 and feed gate opening 42 are such that with shift plate 46 closed, at design speed, particulate matter, such as fertilizer, is dispersed in an even spread pattern with generally uniform concentration. When operated at a higher speeds, an uneven distribution occurs and the spread pattern both broadens and shifts to the right, as viewed from the operator's position behind spreader 10.

Spread shift plate 46 may then be used to increase the area of feed opening 26 and gate feed opening 42 to provide increased flow of material to impeller 20. The increased area of feed gate opening 42 is positioned to place the additional material on impeller 20 to the right as viewed from the operator's position, where it is placed further along in the direction of rotation of impeller 20. So placed, such material compensates for the wider, skewed spread pattern by causing additional material to be thrown to the left side of the spreader as seen from the operator's position. The amount of area added to feed gate opening 42 by adjustment of spread shift plate 46 is variable, so that the operator can adjust spread shift plate 46 and shift the spread pattern depending on his speed and the amount of adjustment required to result in an even spread pattern and to maintain the desired amount of material per unit area.

Similarly, heavy particulate tends to have a spread shift to the right, and increasing the area of feed gate opening 26 and feed gate opening 42 with shift plate 46 serves to shift the spread pattern to a more even spread pattern and a more uniform distribution.

Figure 14:
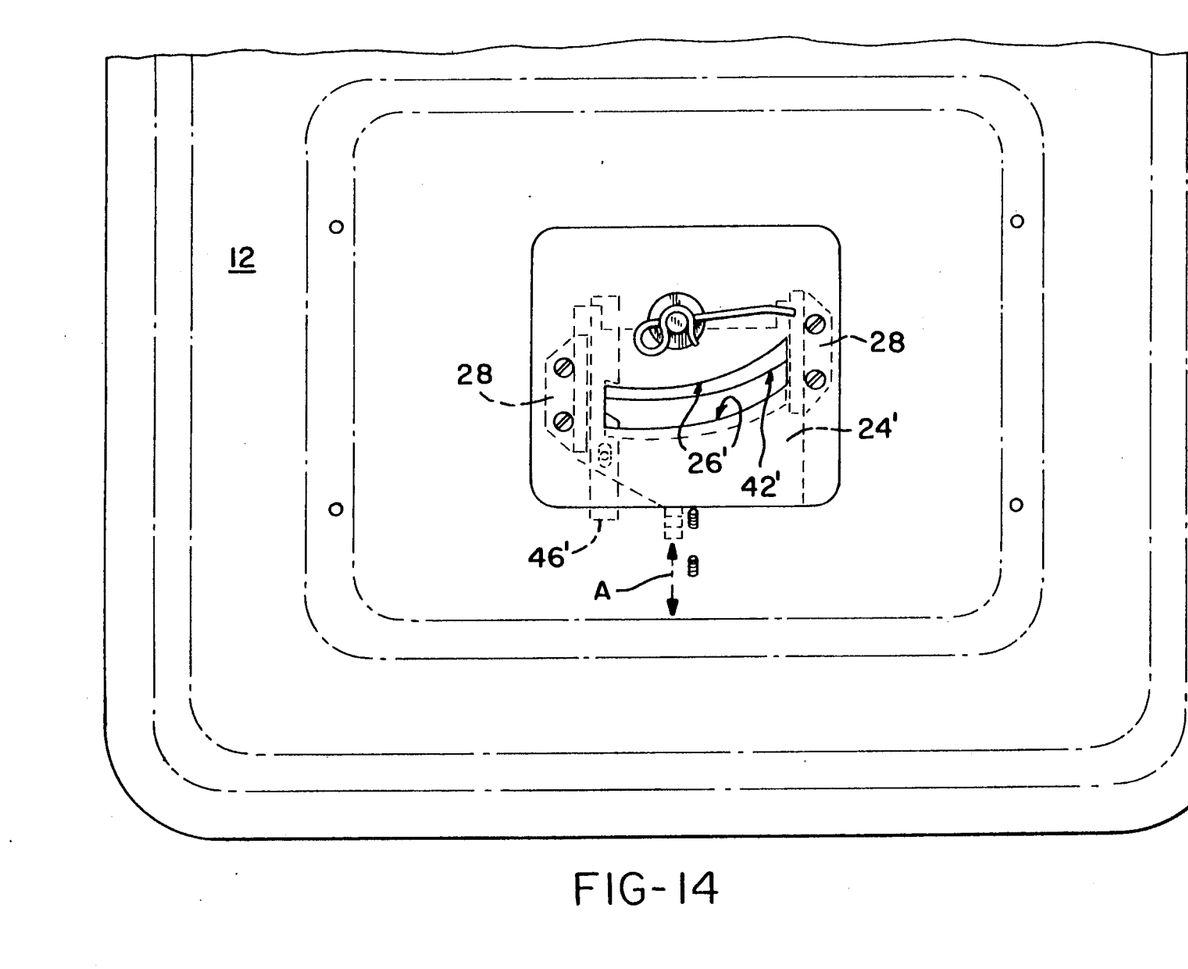
FIG. 14 is a top plan view of an alternative embodiment of the present invention.

In an alternative embodiment, shown in FIG. 14, where like numbers refer to like elements, feed opening 26' and feed gate opening 42' are extended leftward, and spread shift plate 46' located at the left end of feed gate opening 42', as viewed from the operator's position above spreader 10. Impeller 20 rotates counter-clockwise as before. Use of the spread shift plate 46' in the manner previously described, achieves some shift in spread pattern and evens the concentration of material somewhat. However, this embodiment is not preferred as the desired shift in spread pattern is not consistently obtained through the range of operating speeds, material density, and material granular size of interest.

Means for connecting, mounting and attaching the elements of the present invention herein set forth are conventional, except as described. Materials of construction are conventional, and the feed gate 24 is preferably made of a durable, impact-resistant plastic, such as polycarbonate. The shift plate 46 is preferably made of stainless steel. Other metallic elements, such as frame 14, 15, and hopper 12, are made of stainless steel or epoxy-coated carbon steel.

While certain representative embodiments and details have been shown for purposes of illustrating the invention, it will be apparent to those skilled in the art that various changes in the apparatus described herein may be made without departing from the scope of the invention, which is defined in the appended claims.

What is claimed is:

1. A broadcast spreader comprising:
a hopper having a feed opening in the bottom thereof;
a supporting frame attached to said hopper;
a wheel and axle assembly rotatably attached to said frame;
an impeller rotatably disposed below said hopper and attached thereto, positioned to receive material from said feed opening;
means for transmitting rotary motion from said wheel and axle assembly to said impeller; and
first means for varying the area of said feed opening comprising a feed gate slidably disposed across said feed opening for movement in a generally linear direction, said feed gate including a feed gate opening at least as large as said feed opening;
second means for varying the area of said feed opening and for varying the area of said feed gate opening, said second means for varying disposed across an end portion of said feed opening and said feed gate opening, and adapted for movement in a direction generally parallel to said linear direction of said feed gate.

2. A broadcast spreader comprising:
a hopper having a feed opening in the bottom thereof;
a supporting frame attached to said hopper;
a wheel and axle assembly rotatably attached to said frame;
an impeller rotatably disposed below said hopper and attached thereto, positioned to receive material from said feed opening;
means for transmitting rotary motion from said wheel and axle assembly to said impeller; and
first means for varying the area of said feed opening comprising a feed gate slidably disposed across said feed opening, said feed gate including a feed gate opening at least as large as said feed opening; and second means for varying the area of said feed opening and for varying the area of said feed gate opening, said second means for varying disposed across an end portion of said feed opening and said feed gate opening, and said second means for varying comprising a spread shift plate having a wide portion and a narrow portion alignable to close and open, respectively, said end portion of said feed gate opening.

3. A broadcast spreader as recited in claim 2 wherein said narrow portion of said spread shift plate comprises a notch.

4. A broadcast spreader as recited in claim 2 wherein said spread shift plate is slidable in a linear path.

5. A broadcast spreader comprising:
a hopper having a feed opening in the bottom thereof;
a supporting frame attached to said hopper;
a wheel and axle assembly rotatably attached to said frame;
an impeller rotatably disposed below said hopper and positioned to receive material from said feed opening;
means for transmitting rotary motion from said wheel and axle assembly to said impeller;
first means for varying the area of said feed opening comprising a feed gate slidably connected to said hopper across said feed opening, said feed gate further including a feed gate opening; and
second means for varying the area of said feed opening and for varying the area of said feed gate opening, comprising a spread shift plate slidably disposed on said feed gate across a portion of said feed gate opening, said spread shift plate having a wide portion and a narrow portion alternately alignable with said feed gate opening to open and close said portion of said feed gate opening.

6. A broadcast spreader as recited in claim 5 wherein said spread shift plate is slidable in a linear path.

7. A broadcast spreader as recited in claim 6 wherein said narrow portion of said spread shift plate comprises a notch.

8. A broadcast spreader as recited in claim 7 wherein said feed gate opening is at least as large as said feed opening.

9. A broadcast spreader as recited in claim 5 wherein said feed opening has a slot-like shape, said feed gate opening has a slot-like shape, and the longitudinal axes of said feed opening and said feed gate openings are generally transverse to the direction in which said spread shift plate may be slidably displaced.

10. A broadcast spreader as recited in claim 5 wherein said feed gate opening comprises an arcuate, generally rectangular opening.

11. A broadcast spreader as recited in claim 10 wherein said feed gate opening extends to an edge of said feed gate opening.

12. A broadcast spreader as recited in claim 10 wherein said feed opening comprises an arcuate, generally rectangular opening.

13. A broadcast spreader comprising:
broadcast spreader parts, including a hopper having a feed opening therein, one or more wheels, an impeller disposed below said feed opening and rotatably driven by interconnection to said one or more wheels, a feed gate slidable disposed across said feed opening in a generally linear direction, and means for slidable positioning said feed gate across said feed opening;
said feed gate further comprising a feed gate opening at least as large as said feed opening and alignable therewith; and
second means for varying the area of said feed opening and for varying the area of said feed gate opening slidably disposed on said feed gate for movement in a direction generally parallel to said linear direction of said feed gate.

14. A broadcast spreader as recited in claim 13 wherein said feed gate opening comprises an arcuate, generally rectangular opening at least as large as said feed opening.

15. A broadcast spreader comprising:
broadcast spreader parts, including a hopper having a feed opening therein, one or more wheels, an impeller disposed below said feed opening and rotatably driven by interconnection to said one or more wheels, a feed gate slidable disposed across said feed opening, and means for slidable positioning said feed gate across said feed opening;
said feed gate further comprising a feed gate opening at least as large as said feed opening and alignable therewith; and
second means for varying the area of said feed opening and for varying the area of said feed gate opening slidable disposed on said feed gate, said second means for varying comprising a spread shift plate having a wide portion and a narrow portion for closing and opening, respectively, a portion of said feed opening and said feed gate opening.

16. A broadcast spreader as recited in claim 15 wherein said narrow portion of said spread shift plate comprises a notch.

17. A feed gate for use on a broadcast spreader, wherein said broadcast spreader includes a hopper having a feed opening and means for slidable mounting a feed gate across the feed opening, said feed gate comprising:
a feed gate body having a feed gate opening therein;
a spread shift plate for variably closing a portion of said feed gate opening, said spread shift plate slidable disposed on said feed gate across a portion of said feed gate opening;
said spread shift plate having a wide portion and a narrow portion, said wide portion alignable to close said portion of said feed gate opening, and said narrow portion alignable to open a portion of said feed gate opening.

18. A feed gate as recited in claim 17 wherein said spread shift plate is slidable in a linear path.

19. A feed gate as recited in claim 17 wherein alignment of said narrow portion of said spread shift plate with said feed gate opening opens the area of said feed gate opening in a direction generally transverse to the direction said spread shift plate slides.

20. A feed gate as recited in claim 17 wherein at least one surface includes reinforcing ribs.

* * * * *